United States Patent
Deshpande et al.

(10) Patent No.: US 10,565,547 B2
(45) Date of Patent: Feb. 18, 2020

(54) INTER-STORE INVENTORY TRANSFER

(71) Applicant: Wayfair LLC, Boston, MA (US)

(72) Inventors: Ajay A. Deshpande, White Plains, NY (US); Arun Hampapur, Norwalk, CT (US); Yingjie Li, Chappaqua, NY (US); Ding Ding Lin, Beijing (CN); Xuan Liu, Yorktown Heights, NY (US); Dahai Xing, White Plains, NY (US); Xiao Bo Zheng, Shanghai (CN)

(73) Assignee: Wayfair LLC, Boston, MA (US)

( * ) Notice: Subject to any disclaimer, the term of this patent is extended or adjusted under 35 U.S.C. 154(b) by 433 days.

(21) Appl. No.: 15/090,921

(22) Filed: Apr. 5, 2016

(65) Prior Publication Data
US 2017/0286899 A1    Oct. 5, 2017

(51) Int. Cl.
*G06Q 10/08*    (2012.01)
(52) U.S. Cl.
CPC ................. *G06Q 10/087* (2013.01)
(58) Field of Classification Search
CPC ........ G06Q 10/08; G06Q 30/06; G06Q 30/08; G06Q 10/00; G06Q 30/00; G06Q 40/00; G06Q 30/02; G06Q 50/00; G06Q 20/20; G06Q 20/00
USPC ..... 705/14.49, 26.7, 26.8, 14.23, 26.4, 26.3, 705/335, 37, 27.1, 2, 16, 24, 28, 29, 400
See application file for complete search history.

(56) References Cited

U.S. PATENT DOCUMENTS

| | | | |
|---|---|---|---|
| 7,092,929 B1* | 8/2006 | Dvorak | G06Q 10/087 705/28 |
| 7,774,234 B1* | 8/2010 | Kopelman | G06Q 30/06 705/26.1 |
| 8,104,681 B2 | 1/2012 | Eisenson | |
| 8,666,846 B1* | 3/2014 | Chenault | G06Q 10/08 705/22 |
| 8,732,039 B1 | 5/2014 | Chen et al. | |
| 9,195,959 B1* | 11/2015 | Lopez | G06Q 30/0635 |
| 2002/0032613 A1* | 3/2002 | Buettgenbach | G06Q 10/08 705/26.8 |
| 2004/0049427 A1* | 3/2004 | Tami | G06Q 20/209 705/24 |

(Continued)

OTHER PUBLICATIONS

Elliot Bendoly, "Integrated inventory pooling for firms servicing both on-line and store demand", 2004, Computers & Operations Research, vol. 31, Issue 9, p. 1465-1480.

(Continued)

*Primary Examiner* — Olusegun Goyea
(74) *Attorney, Agent, or Firm* — Wolf, Greenfield & Sacks, P.C.

(57) ABSTRACT

Examples of techniques for generating an inter-store inventory transfer are disclosed. In one example implementation according to aspects of the present disclosure, a computer-implemented method may include defining a subset of stores of a plurality of stores to fulfill inter-store inventory transfer request for a product category of a plurality of product categories. The method may further include, responsive to determining that an order for a product of the product category cannot be fulfilled by one of the stores of the subset of stores of the plurality of stores, determining, by a processing device, an alternate store of the subset of stores to fulfill the order.

20 Claims, 5 Drawing Sheets

(56) References Cited

U.S. PATENT DOCUMENTS

| | | | | |
|---|---|---|---|---|
| 2004/0133474 | A1* | 7/2004 | Tami | G06Q 20/20 705/16 |
| 2007/0150375 | A1* | 6/2007 | Yang | G06Q 10/08 705/339 |
| 2008/0027836 | A1 | 1/2008 | Chapin | |
| 2010/0262521 | A1* | 10/2010 | Robinson | G06Q 10/08 705/29 |
| 2010/0268378 | A1* | 10/2010 | Sharpley | A47J 31/52 700/233 |
| 2011/0161182 | A1* | 6/2011 | Racco | G06Q 30/0277 705/14.73 |
| 2011/0257991 | A1* | 10/2011 | Shukla | G06Q 50/22 705/2 |
| 2012/0221393 | A1* | 8/2012 | Ouimet | G06Q 30/0239 705/14.23 |
| 2012/0253908 | A1* | 10/2012 | Ouimet | G06Q 30/02 705/14.23 |
| 2012/0310758 | A1* | 12/2012 | Bai | G06Q 30/0633 705/23 |
| 2013/0066740 | A1* | 3/2013 | Ouimet | G06Q 30/06 705/26.7 |
| 2013/0151381 | A1* | 6/2013 | Klein | G06Q 30/0641 705/27.1 |
| 2013/0159144 | A1* | 6/2013 | Higgins | G06Q 30/0601 705/26.81 |
| 2013/0166468 | A1 | 6/2013 | Vogelgesang | |
| 2013/0317921 | A1* | 11/2013 | Havas | G06Q 30/0633 705/15 |
| 2014/0019288 | A1* | 1/2014 | Bossinakis | G06Q 10/06315 705/26.4 |
| 2014/0101001 | A1* | 4/2014 | Brown | G06Q 10/087 705/28 |
| 2014/0156392 | A1* | 6/2014 | Ouimet | G06Q 30/02 705/14.49 |
| 2014/0188601 | A1* | 7/2014 | Buset | G06Q 30/0633 705/14.49 |
| 2014/0297470 | A1* | 10/2014 | Ramadge | G06Q 30/0613 705/26.41 |
| 2016/0063436 | A1* | 3/2016 | Coles | G06Q 10/08345 705/335 |
| 2016/0189069 | A1* | 6/2016 | de Montfort Walker | G06Q 10/06312 705/5 |
| 2016/0189262 | A1* | 6/2016 | Raab | G06Q 30/0613 705/26.3 |
| 2016/0260158 | A1* | 9/2016 | High | G05D 1/0297 |
| 2016/0350838 | A1* | 12/2016 | Tsao | G06Q 30/0635 |
| 2017/0206217 | A1 | 7/2017 | Deshpande et al. | |
| 2017/0206478 | A1 | 7/2017 | Deshpande et al. | |
| 2017/0206481 | A1 | 7/2017 | Cheeran et al. | |
| 2017/0206485 | A1 | 7/2017 | Deshpande et al. | |
| 2017/0206490 | A1 | 7/2017 | Deshpande et al. | |
| 2017/0206499 | A1 | 7/2017 | Deshpande et al. | |
| 2017/0206500 | A1 | 7/2017 | Deshpande et al. | |
| 2017/0206541 | A1 | 7/2017 | Deshpande et al. | |
| 2017/0206589 | A1 | 7/2017 | Deshpande et al. | |
| 2017/0206592 | A1 | 7/2017 | Chen et al. | |
| 2017/0213174 | A1 | 7/2017 | Deshpande et al. | |
| 2017/0286899 | A1 | 10/2017 | Deshpande et al. | |
| 2017/0330123 | A1 | 11/2017 | Deshpande et al. | |
| 2017/0330124 | A1 | 11/2017 | Deshpande et al. | |
| 2017/0330211 | A1 | 11/2017 | Deshpande et al. | |
| 2017/0330218 | A1 | 11/2017 | Deshpande et al. | |
| 2017/0330259 | A1 | 11/2017 | Deshpande et al. | |
| 2017/0330266 | A1 | 11/2017 | Deshpande et al. | |

OTHER PUBLICATIONS

Whitepaper, "Omnichannel Inventory Optimization: Where Are My Products?", Apr. 23, 2014, The parker Avery Group, p. 1-10.

Whitepapers, "The Core of Omnichannel Retailing" Kurt Samlon, May 13, 2013, p. 1-8.

* cited by examiner

INTER-STORE INVENTORY TRANSFER

BACKGROUND

The present disclosure relates to techniques for inventory control and, in particular, to techniques for generating an inter-store inventory transfer.

Retailers often encounter the situation in which some stores are out of stock of a particular item (often referred to as a "SKU" after its associated stock keeping unit) while other stores have surplus stock for the same item/SKU. Such situations can lead to either loss of a sale or markdown. The common approaches to rebalance inventory include strategic inventory allocation, replenishment from a central warehouse or distribution center, and inventory transfer between successive replenishments. However, none of these approaches provide real-time inter-store transfer decision making to satisfy an in-store customer's demand. For omni-channel retailers, quick responsiveness to in-store customers is important for generating revenue and maintaining customer satisfaction while minimizing overall cost-to-serve.

SUMMARY

In accordance with aspects of the present disclosure, a computer-implemented method for generating an inter-store inventory transfer is provided. The computer-implemented method may include defining a subset of stores of a plurality of stores to fulfill inter-store inventory transfer request for a product category of a plurality of product categories. The computer-implemented method may further include, responsive to determining that an order for a product of the product category cannot be fulfilled by one of the stores of the subset of stores of the plurality of stores, determining, by a processing device, an alternate store of the subset of stores to fulfill the order.

In accordance with additional aspects of the present disclosure, a system for generating an inter-store inventory transfer is provided. The system may include a processor in communication with one or more types of memory. The processor may be configured to define a subset of stores of a plurality of stores to fulfill inter-store inventory transfer request for a product category of a plurality of product categories. The processor may be further configured to, responsive to determining that an order for a product of the product category cannot be fulfilled by one of the stores of the subset of stores of the plurality of stores, determine an alternate store of the subset of stores to fulfill the order.

In accordance with yet additional aspects of the present disclosure, a computer program product for generating an inter-store inventory transfer is provided. The computer program product may include a non-transitory storage medium readable by a processing circuit and storing instructions for execution by the processing circuit for performing a method. The method may include defining a subset of stores of a plurality of stores to fulfill inter-store inventory transfer request for a product category of a plurality of product categories. The method may further include, responsive to determining that an order for a product of the product category cannot be fulfilled by one of the stores of the subset of stores of the plurality of stores, determining an alternate store of the subset of stores to fulfill the order.

BRIEF DESCRIPTION OF THE DRAWINGS

The subject matter which is regarded as the invention is particularly pointed out and distinctly claimed in the claims at the conclusion of the specification. The forgoing and other features, and advantages thereof, are apparent from the following detailed description taken in conjunction with the accompanying drawings in which:

DETAILED DESCRIPTION

Various implementations are described below by referring to several examples of techniques for generating an inter-store inventory transfer. Such transfers may be useful when, for example, a customer is in a store and desires to purchase an item. If the item is out of stock, the present techniques may be applied to enable an inter-store inventory transfer of the item from an alternate store for fulfillment.

In particular, the present techniques provide a two-phase optimization approach to select an alternate store to fulfill an order when one store is out-of-stock of an item. In the first phase, an inventory pool generation engine is used to select stores to serve a demand zone for a given product category. In the second phase, a customer order that cannot be fulfilled by the store is fed into an alternate store selection engine to determine an alternate store for order fulfillment. The inventory pool generation engine creates a small group of stores with a minimal cost-to-serve for a given demand zone and a given product category prior to the arrival of the in-store customer order. In this way, the number of candidates for the alternate store selection engine in the second phase is reduced and the alternate store can be determined in real time.

The present techniques provide flexible fulfillment, which is important in the retail environment. For example, many purchases occur by customers in retail stores. The present techniques provide real-time inter-store inventory transfer decisions to be made in order to fulfill in-store customer orders for out-of-stock items. This enables retailers to respond to in-store customers in a faster way and thereby improve customer service. These and other advantages will be apparent from the description that follows.

Figure 1:
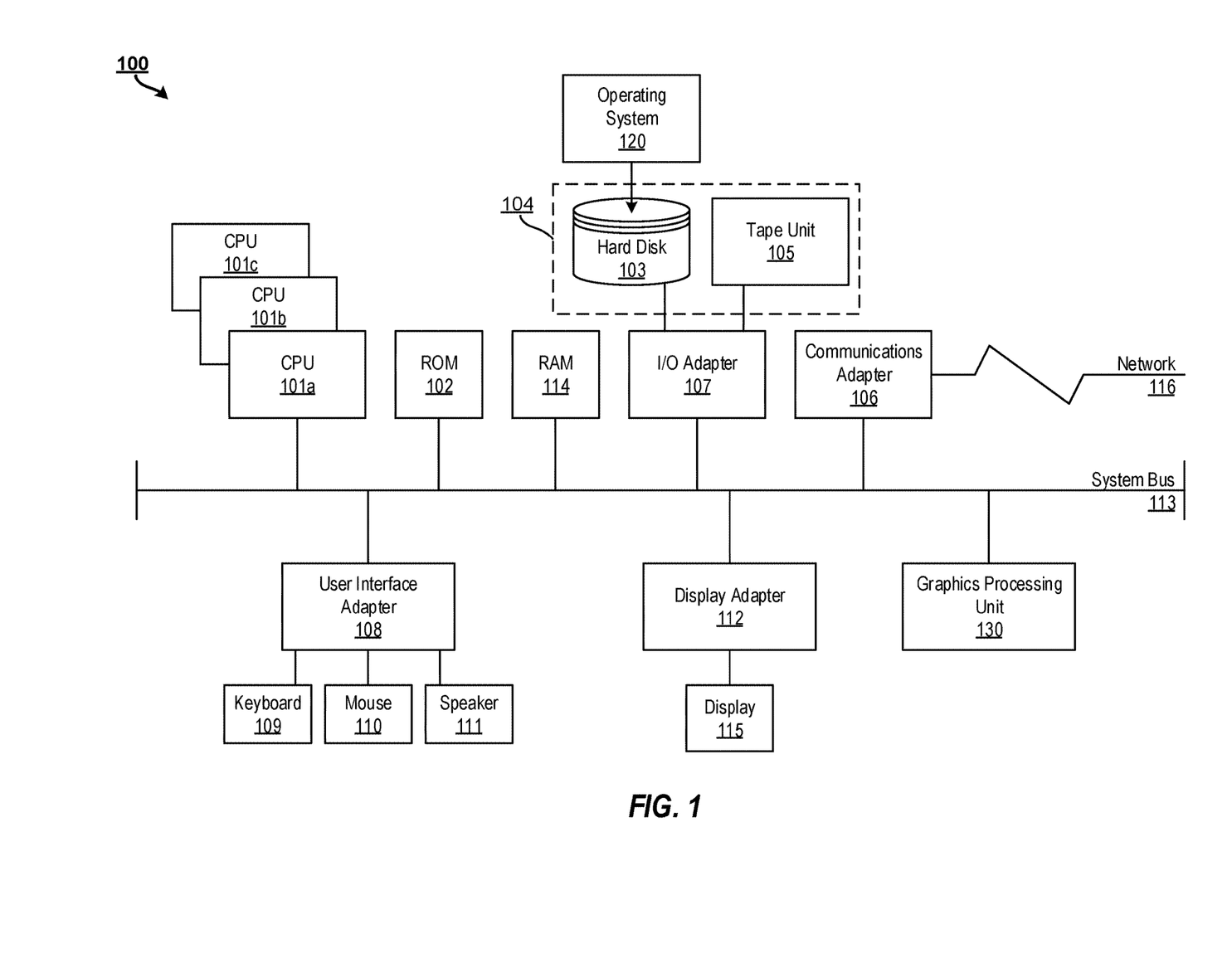
FIG. 1 illustrates a block diagram of a processing system for implementing the techniques described herein according to examples of the present disclosure.

FIG. 1 illustrates a block diagram of a processing system 100 for implementing the techniques described herein. In examples, the processing system 100 has one or more central processing units (processors) 101a, 101b, 101c, etc. (collectively or generically referred to as processor(s) 101). In aspects of the present disclosure, each processor 101 may include a reduced instruction set computer (RISC) microprocessor. Processors 101 are coupled to system memory (e.g., random access memory (RAM) 114 and various other components via a system bus 113. Read only memory (ROM) 102 is coupled to the system bus 113 and may include a basic input/output system (BIOS), which controls certain basic functions of the processing system 100.

FIG. 1 further illustrates an input/output (I/O) adapter 107 and a communications adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling the processing system 100 to communicate with other such systems.

A screen (e.g., a display monitor) 115 is connected to system bus 113 by display adaptor 112, which may include a graphics adapter to improve the performance of graphics intensive applications and a video controller. In one aspect of the present disclosure, adapters 106, 107, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In some aspects of the present disclosure, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 1, the processing system 100 includes processing capability in the form of processors 101, storage capability including system memory 114 and mass storage 104, input means such as keyboard 109 and mouse 110, and output capability including speaker 111 and display 115. In some aspects of the present disclosure, a portion of system memory 114 and mass storage 104 collectively store an operating system such as the AIX® operating system from IBM Corporation to coordinate the functions of the various components shown in FIG. 1.

Figure 2:
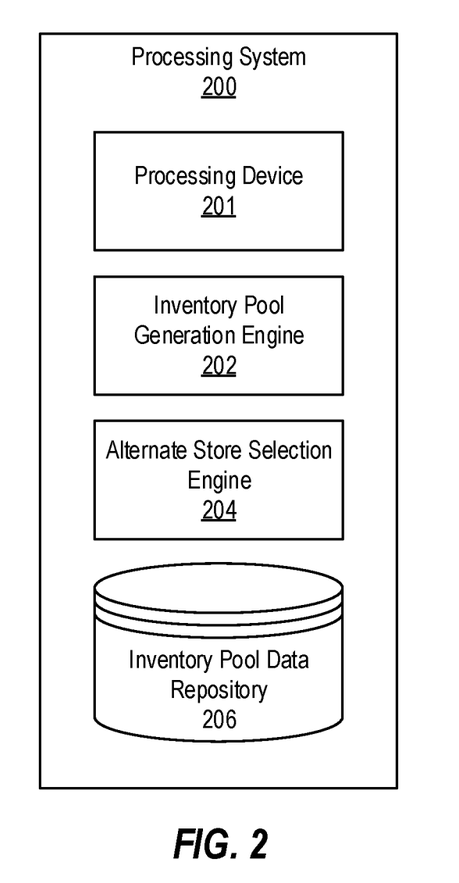
FIG. 2 illustrates a block diagram of a processing system for generating an inter-store inventory transfer according to examples of the present disclosure.

FIG. 2 illustrates a block diagram of a processing system 200 for generating an inter-store inventory transfer according to examples of the present disclosure. The various components, modules, engines, etc. described regarding FIG. 2 may be implemented as instructions stored on a computer-readable storage medium, as hardware modules, as special-purpose hardware (e.g., application specific hardware, application specific integrated circuits (ASICs), as embedded controllers, hardwired circuitry, etc.), or as some combination or combinations of these. In examples, the engine(s) described herein may be a combination of hardware and programming. The programming may be processor executable instructions stored on a tangible memory, and the hardware may include processing device 201 for executing those instructions. Thus system memory 114 of FIG. 1 can be said to store program instructions that when executed by processing device 201 implement the engines described herein. Other engines may also be utilized to include other features and functionality described in other examples herein.

Processing system 200 may include processing device 201, inventory pool generation engine 202, alternate store selection engine 204, and inventory pool data repository 206. Alternatively or additionally, the processing system 200 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. Together, inventory pool generation engine 202 and alternate store selection engine 204 perform a two-phase optimization to determine an optimal alternate store in real time when an order cannot be fulfilled for a customer at a store.

In the first phase, inventory pool generation engine 202 selects stores to serve a demand zone for a given product category. For example, inventory pool generation engine 202 may define a subset of stores of a plurality of stores to fulfill inter-store inventory transfer request for a product category. To do this, inventory pool generation engine 202 may receive aggregated in-store demand data for each of the plurality of stores as well as control parameters (e.g., a product shipping cost, a product handling cost, a service level penalty cost, and an inventory capacity of each product of the product category at each of the subset of the plurality of stores). Inventory pool generation engine 202 may then formulate a mixed integer programming model to calculate, based on the demand data and the control parameters, a minimized total cost-to-serve to fulfill the demand of a product for each of the product categories and the corresponding subset of stores. Once calculated, inventory pool generation engine 202 may store the calculated subsets of stores with the minimized total cost-to serve in inventory pool data repository 206.

Alternate store selection engine 204 determines an alternate store for order fulfillment after it is determined that a store (i.e., the store at which the customer is located) cannot fulfill the order. For example, alternative store selection engine 204 determines an alternate store of the subset of stores to fulfill the order responsive to determining that an order for a product of the product category cannot be fulfilled by one of the stores of the subset of stores of the plurality of stores. To do this, alternate store selection engine 204 queries inventory pool data repository 206 that store the calculated subsets of stores with the minimized total cost-to-serve from inventory pool generation engine 202. Alternate store selection engine 204 also queries an inventory status of each store of the subset of stores. The inventory status for each store may be maintained, for example, on a central database accessible by the individual stores or may be maintained on separate databases at each store, or combinations thereof.

Alternate store selection engine 204 then determines the alternate store of the subset of stores to fulfill the order with an objective of minimizing at least one of a shipping cost, an inventory balancing cost, and a markdown cost. Alternate store selection engine 204 then generates an inter-store transfer order to the alternate store to fulfill the order responsive to determining the alternate store of the subset of stores to fulfill the order. However, if no alternate store can be determined to be suitable, alternate store selection engine 204 may passing the order to an e-commerce system to fulfill the order.

Figure 3:
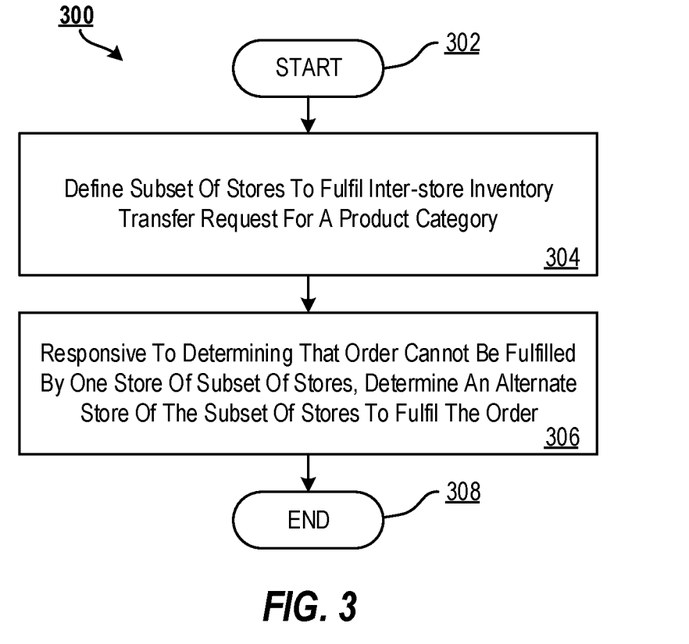
FIG. 3 illustrates a flow diagram of a method for generating an inter-store inventory transfer according to examples of the present disclosure.

FIG. 3 illustrates a flow diagram of a method 300 for generating an inter-store inventory transfer according to examples of the present disclosure. Method 300 starts at block 302 and continues to block 304. At block 304, method 300 includes defining a subset of stores of a plurality of stores to fulfill inter-store inventory transfer requests for a product category. At block 306, method 300 includes upon a determination that an order for a product of the product category cannot be fulfilled by one of the stores of the subset of stores of the plurality of stores, determining, by a processing device, an alternate store of the subset of stores to fulfill the order. Method 300 continues to block 308 and ends.

Additional processes also may be included. For example, method 300 may also include, responsive to determining that no alternate store of the subset of stores can fulfill the order, passing the order to an e-commerce system to fulfill the order. In examples, a customer is located at the one of the stores of the subset of stores of the plurality of stores that cannot fulfill the order. It should be understood that the processes depicted in FIG. 3 represent illustrations, and that other processes may be added or existing processes may be removed, modified, or rearranged without departing from the scope and spirit of the present disclosure.

Figure 4:
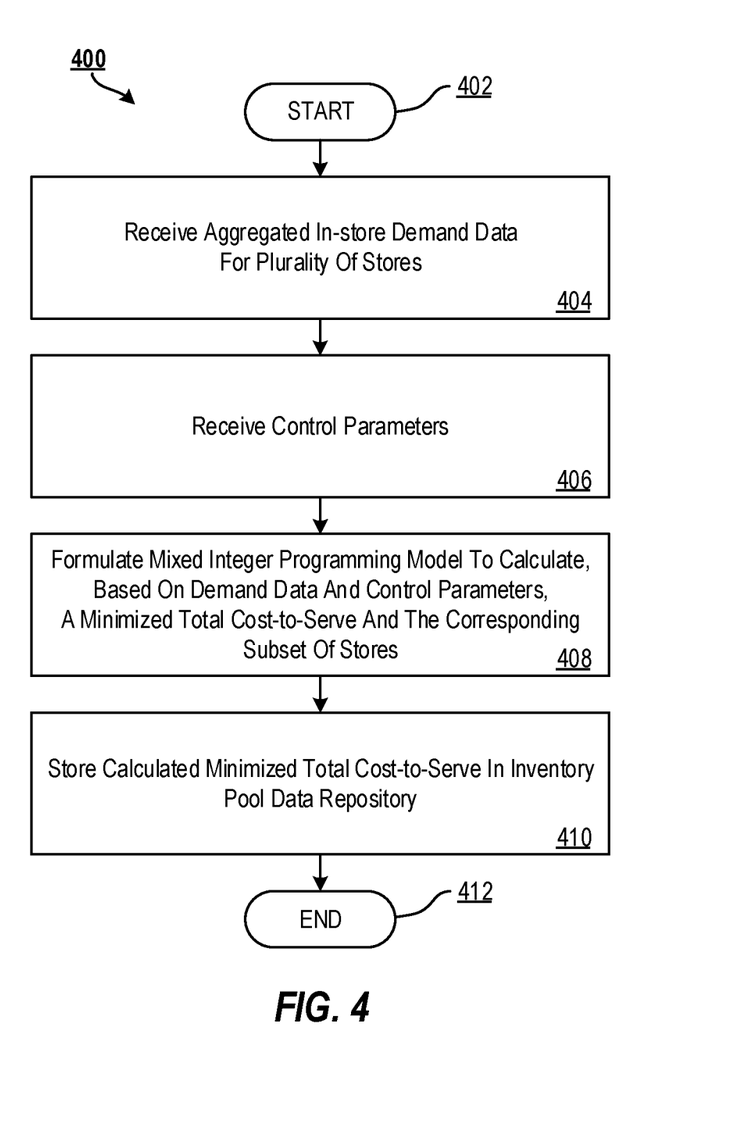
FIG. 4 illustrates a flow diagram of a method for defining a subset of stores to fulfill an inter-store inventory transfer request for a product category according to examples of the present disclosure.

FIG. 4 illustrates a flow diagram of a method 400 for defining a subset of stores to fulfill an inter-store inventory transfer request for a product category according to examples of the present disclosure. It should be appreciated that method 400 is one possible technique for implementing block 304 of FIG. 3. Method 400 starts at block 402 and continues to block 404.

At block 404, method 400 includes receiving aggregated in-store demand data for each of the plurality of stores. At block 406, method 400 includes receiving control parameters. In examples, the control parameters may include at least one of a product shipping cost, a product handling cost, a service level penalty cost, and an inventory capacity of each product of the product category at each of the subset of the plurality of stores. At block 408, method 400 includes formulating, by the processing device, a mixed integer programming model to calculate, based on the demand data and the control parameters, a minimized total cost-to-serve to fulfil the demand of a product for each of the product categories and each demand zone and the corresponding subset of stores. At block 410, method 400 includes storing the calculated subsets of stores with the minimized total cost-to serve in an inventory pool data repository. Method 400 continues to block 412 and ends.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
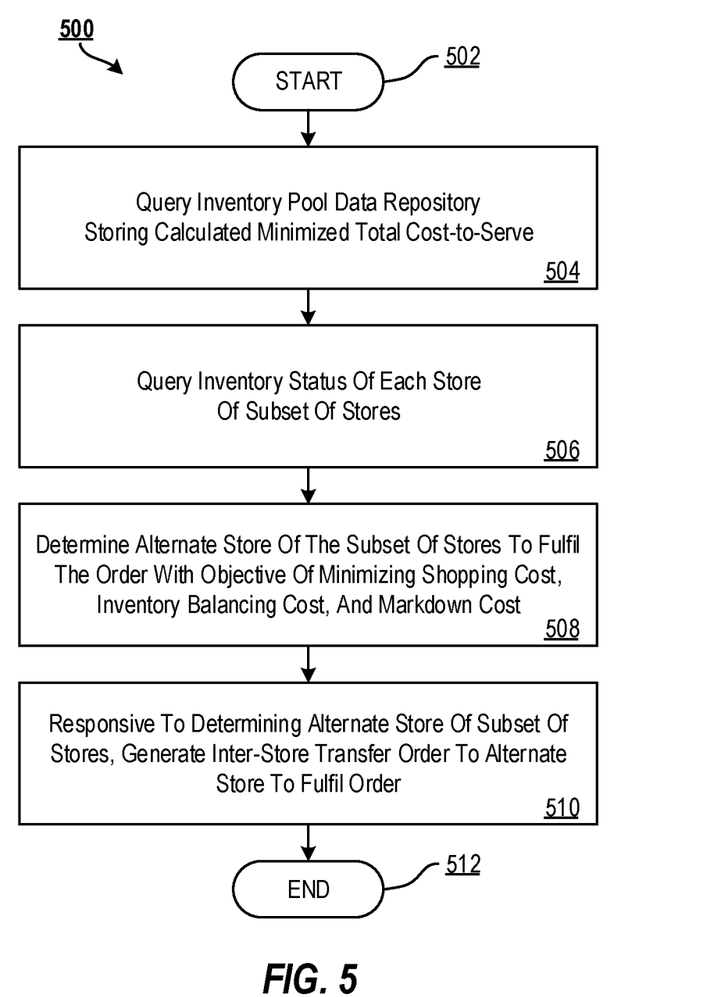
FIG. 5 illustrates a flow diagram of a method for determining an alternate store of the subset of stores to fulfill the order according to examples of the present disclosure.

FIG. 5 illustrates a flow diagram of a method 500 for determining an alternate store of the subset of stores to fulfill the order according to examples of the present disclosure. It should be appreciated that method 500 is one possible technique for implementing block 306 of FIG. 3. Method 500 starts at block 500 and continues to block 502.

At block 504, method 500 includes querying an inventory pool data repository storing a calculated minimized total cost-to-serve and the corresponding subset of stores. At block 506, method 500 includes querying an inventory status of each store of the subset of stores. At block 508, method 500 includes determining, by the processing device, the alternate store of the subset of stores to fulfill the order with an objective of minimizing at least one of a shipping cost, an inventory balancing cost, and a markdown cost. At block 510, method 500 includes responsive to determining the alternate store of the subset of stores to fulfill the order, generating an inter-store transfer order to the alternate store to fulfill the order. Method 500 continues to block 512 and ends.

Additional processes also may be included, and it should be understood that the processes depicted in FIG. 5 represent illustrations, and that other processes may be added or existing processes may be removed, modified, or rearranged without departing from the scope and spirit of the present disclosure.

The present techniques may be implemented as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some examples, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to aspects of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for generating an inter-store inventory transfer, the method comprising:
    defining a subset of stores of a plurality of stores, based at least in part on aggregated in-store demand data for each of the plurality of stores and control parameters, to fulfill inter-store inventory transfer requests for a product category of a plurality of product categories;
    responsive to determining that an order for a product of the product category cannot be fulfilled by one of the stores of the subset of stores of the plurality of stores, determining, by a processing device, an alternate store of the subset of stores to fulfill the order, wherein the alternate store is selected as having at least two of a minimum shipping cost, a minimum inventory balancing cost, or a minimum markdown cost; and
    fulfilling the order for the product by transferring the product from the alternate store of the subset of stores to the one of the stores of the subset of stores of the plurality of stores that cannot fulfill the order.

2. The computer-implemented method of claim 1, wherein a customer is located at the one of the stores of the subset of stores of the plurality of stores that cannot fulfill the order.

3. The computer-implemented method of claim 1, wherein defining a subset of stores of a plurality of stores to fulfill inter-store inventory transfer requests for a product category further comprises:
    receiving the aggregated in-store demand data for each of the plurality of stores.

4. The computer-implemented method of claim 3, wherein defining a subset of stores of a plurality of stores to fulfill inter-store inventory transfer requests for a product category further comprises:
    receiving the control parameters.

5. The computer-implemented method of claim 4, wherein the control parameters comprise at least one of a product shipping cost, a product handling cost, a service level penalty cost, and an inventory capacity of each product of the product category at each of the subset of the plurality of stores.

6. The computer-implemented method of claim 4, wherein defining a subset of stores of a plurality of stores to fulfill inter-store inventory transfer requests for a product category further comprises:
    formulating, by the processing device, a mixed integer programming model to calculate, based on the demand data and the control parameters, a minimized total cost-to-serve to fulfill a demand of a product for each of the plurality of product categories, each of a plurality of demand zones, and the subset of stores; and
    storing the minimized total cost-to serve in an inventory pool data repository.

7. The computer-implemented method of claim 1, wherein determining the alternate store of the subset of stores to fulfill the order further comprises:
    querying an inventory pool data repository storing a calculated minimized total cost-to-serve and the subset of stores.

8. The computer-implemented method of claim 7, wherein determining the alternate store of the subset of stores to fulfill the order further comprises:
   querying an inventory status of each store of the subset of stores.

9. The computer-implemented method of claim 1, wherein determining the alternate store of the subset of stores to fulfill the order further comprises:
   responsive to determining the alternate store of the subset of stores to fulfill the order, generating an inter-store transfer order to the alternate store to fulfill the order.

10. The computer-implemented method of claim 1, wherein determining the alternate store of the subset of stores to fulfill the order further comprises:
   responsive to determining that no alternate store of the subset of stores can fulfill the order, passing the order to an e-commerce system to fulfill the order.

11. A system for generating an inter-store inventory transfer, the system comprising:
   a processor in communication with one or more types of memory, the processor configured to:
      define a subset of stores of a plurality of stores, based at least in part on aggregated in-store demand data for each of the plurality of stores and control parameters, to fulfill inter-store inventory transfer requests for a product category of a plurality of product categories;
      responsive to determining that an order for a product of the product category cannot be fulfilled by one of the stores of the subset of stores of the plurality of stores, determine an alternate store of the subset of stores to fulfill the order, wherein the alternate store is selected as having at least two of a minimum shipping cost, a minimum inventory balancing cost, or a minimum markdown cost; and
      fulfill the order for the product by transferring the product from the alternate store of the subset of stores to the one of the stores of the subset of stores of the plurality of stores that cannot fulfill the order.

12. The system of claim 11, wherein a customer is located at the one of the stores of the subset of stores of the plurality of stores that cannot fulfill the order.

13. The system of claim 11, wherein defining a subset of stores of a plurality of stores to fulfill inter-store inventory transfer requests for a product category further comprises:
   receiving the aggregated in-store demand data for each of the plurality of stores;
   receiving the control parameters;
   formulating, by the processor, a mixed integer programming model to calculate, based on the demand data and the control parameters, a minimized total cost-to-serve to fulfill a demand of a product for each of the plurality of product categories, each of a plurality of demand zones, and the subset of stores; and
   storing the minimized total cost-to serve in an inventory pool data repository.

14. The system of claim 13, wherein the control parameters comprise at least one of a product shipping cost, a product handling cost, a service level penalty cost, and an inventory capacity of each product of the product category at each of the subset of the plurality of stores.

15. The system of claim 11, wherein determining the alternate store of the subset of stores to fulfill the order further comprises:
   querying an inventory pool data repository storing a calculated minimized total cost-to-serve and the subset of stores;
   querying an inventory status of each store of the subset of stores; and
   responsive to determining the alternate store of the subset of stores to fulfill the order, generating an inter-store transfer order to the alternate store to fulfill the order.

16. A computer program product for generating an inter-store inventory transfer, the computer program product comprising:
   a non-transitory storage medium readable by a processing circuit and storing instructions for execution by the processing circuit for performing a method comprising:
      defining a subset of stores of a plurality of stores, based at least in part on aggregated in-store demand data for each of the plurality of stores and control parameters, to fulfill inter-store inventory transfer requests for a product category of a plurality of product categories;
      responsive to determining that an order for a product of the product category cannot be fulfilled by one of the stores of the subset of stores of the plurality of stores, determining an alternate store of the subset of stores to fulfill the order, wherein the alternate store is selected as having at least two of a minimum shipping cost, a minimum inventory balancing cost, or a minimum markdown cost; and
      fulfilling the order for the product by transferring the product from the alternate store of the subset of stores to the one of the stores of the subset of stores of the plurality of stores that cannot fulfill the order.

17. The computer program product of claim 16, wherein a customer is located at the one of the stores of the subset of stores of the plurality of stores that cannot fulfill the order.

18. The computer program product of claim 16, wherein defining a subset of stores of a plurality of stores to fulfill inter-store inventory transfer requests for a product category further comprises:
   receiving the aggregated in-store demand data for each of the plurality of stores;
   receiving the control parameters;
   formulating, by the processing circuit, a mixed integer programming model to calculate, based on the demand data and the control parameters, a minimized total cost-to-serve to fulfill a demand of a product for each of the plurality of product categories, each of a plurality of demand zones, and the subset of stores; and
   storing the minimized total cost-to serve in an inventory pool data repository.

19. The computer program product of claim 16, wherein determining the alternate store of the subset of stores to fulfill the order further comprises:
   querying an inventory pool data repository storing a calculated minimized total cost-to-serve and the subset of stores;
   querying an inventory status of each store of the subset of stores; and
   responsive to determining the alternate store of the subset of stores to fulfill the order, generating an inter-store transfer order to the alternate store to fulfill the order.

20. The computer-implemented method of claim 1, wherein defining the subset of stores of the plurality of stores to fulfil inter-store inventory transfer requests for the product category comprises:
   formulating, by the processing device, a mixed integer programming model to calculate, based on the aggregated in-store demand data and the control parameters, a minimized total cost-to-serve to fulfill a demand of a product for each of the plurality of product categories, each of a plurality of demand zones, and the subset of stores,
wherein the control parameters comprise a product shipping cost, a product handling cost, a service level penalty cost, and an inventory capacity of each product of the product category at each of the subset of the plurality of stores.

\* \* \* \* \*